G. A. LYON.
RETAINER ATTACHER FOR VEHICLE BUFFERS.
APPLICATION FILED NOV. 1, 1919.
1,351,049.
Patented Aug. 31, 1920.
2 SHEETS—SHEET 1.
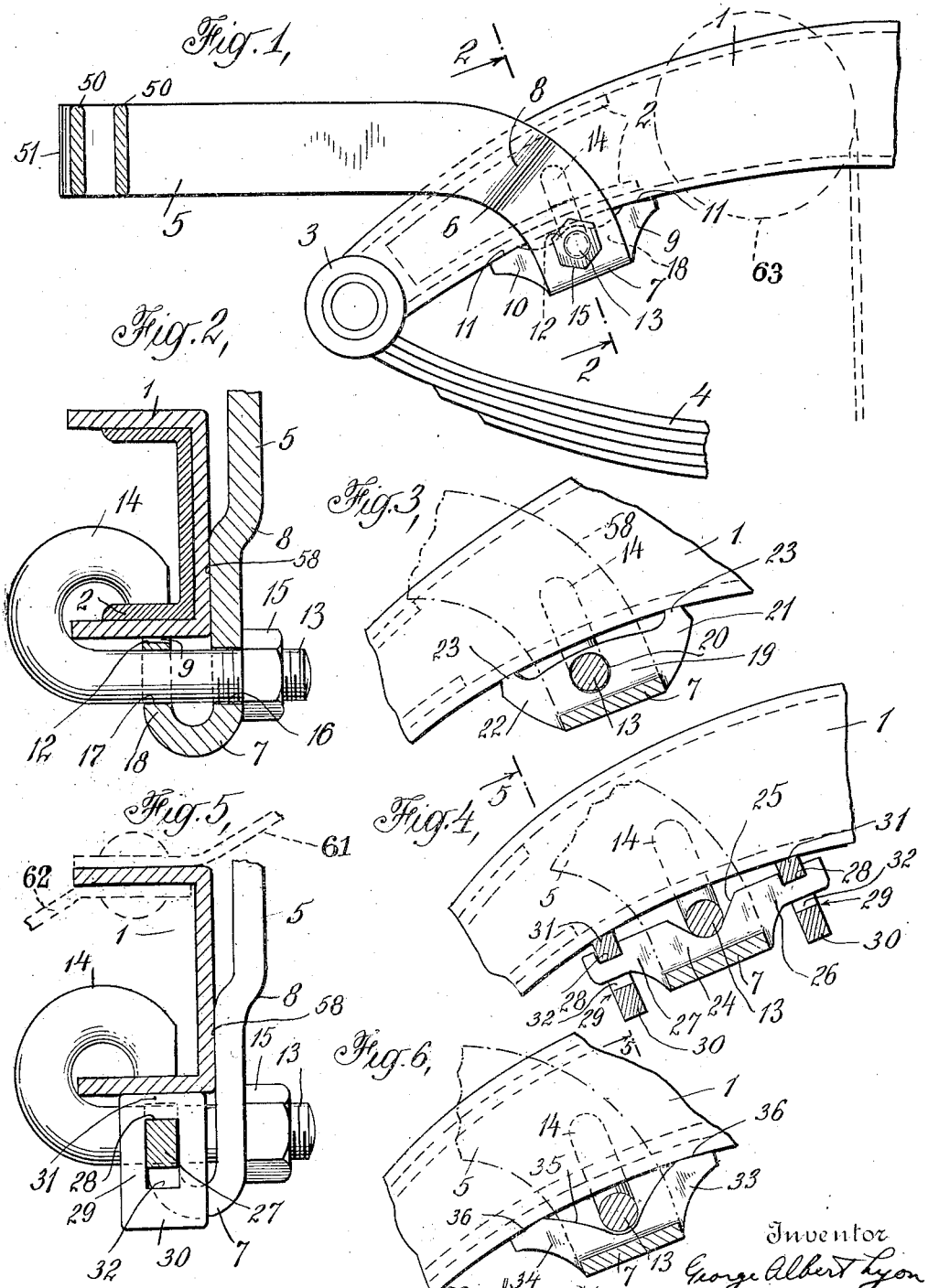

G. A. LYON.
RETAINER ATTACHER FOR VEHICLE BUFFERS.
APPLICATION FILED NOV. 1, 1919.
1,351,049.
Patented Aug. 31, 1920.
2 SHEETS—SHEET 2.
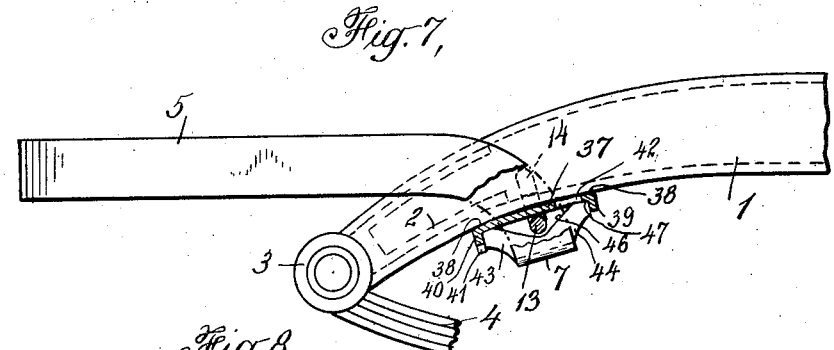
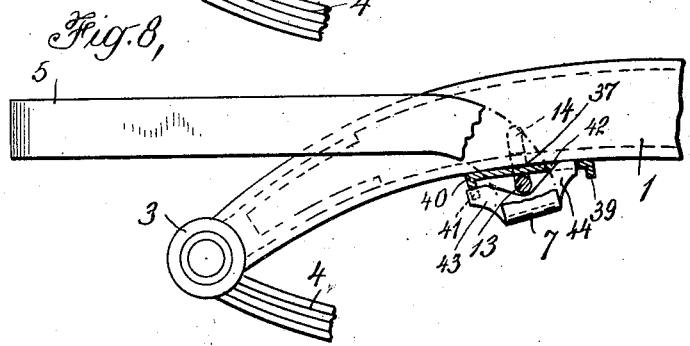
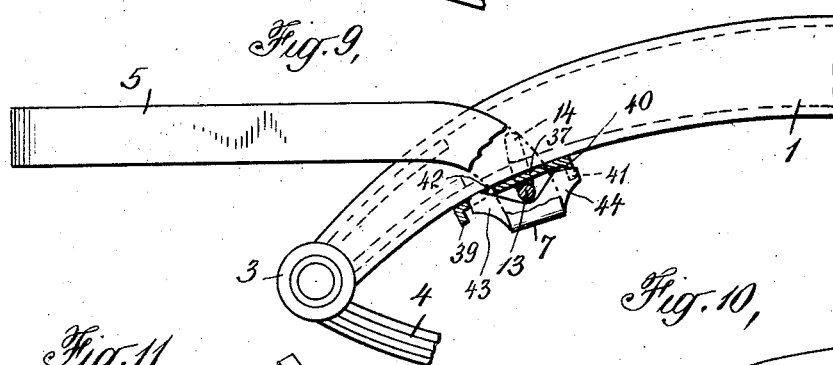
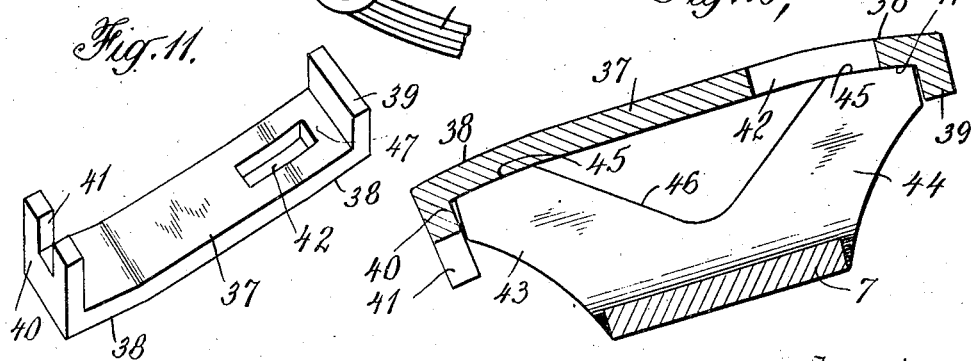
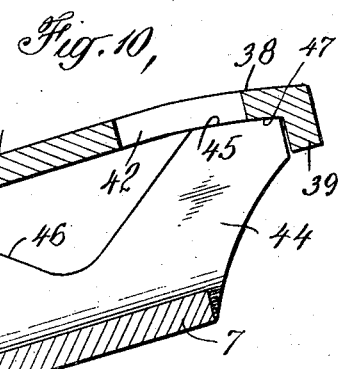
Inventor
George Albert Lyon
By his Attorney
Harry L. Duncan

UNITED STATES PATENT OFFICE.

GEORGE ALBERT LYON, OF PHILADELPHIA, PENNSYLVANIA.

RETAINER-ATTACHER FOR VEHICLE-BUFFERS.

1,351,049.  Specification of Letters Patent.  Patented Aug. 31, 1920.

Application filed November 1, 1919. Serial No. 335,052.

*To all whom it may concern:*

Be it known that I, GEORGE ALBERT LYON, a citizen of the United States, and resident of Philadelphia, county of Philadelphia, State of Pennsylvania, have made certain new and useful Inventions Relating to Retainer-Attachers for Vehicle-Buffers, of which the following is a specification, taken in connection with the accompanying drawing.

This invention relates especially to retainer attachers for buffers intended for use on automobiles or other vehicles and in which the attaching members preferably of spring steel or other resilient strip material which may in some cases be integral with the buffer front members are formed with bearing members adapted to engage the automobile frame members and with adjacent recurved alining portions which may be formed with bolt apertures or holes to coöperate with the hook bolt or retainer which may be used in connection therewith to engage the inner flange face of the frame member. In this way the attaching member may have its recurved lower portion bifurcated so as to form separated alining supporting members adapted to coöperate with the lower flange of the frame member so as to securely support the attaching member in connection therewith in coöperation with the one or more hook bolts which may be used to engage the frame at or adjacent this point. The resilient or other buffer front member secured to the attaching members in a rigid manner naturally reinforces their action by resiliently maintaining the attaching members at substantially the same distance apart as is referred to in the Lyon Patent 1,266,836 of May 21, 1918, covering this general type of hook bolt retainer devices. By this present improvement a minimum longitudinal extension of the retainer attacher devices is secured longitudinally of the frame member together with a relatively slight lateral projection therefrom, so that the device can be used in connection with automobile frames on which spring cushioning devices such as shock absorbers or snubbers have been installed. The angular positioning of the attaching member so as to bring the buffer front into the desired horizontal or forward position with respect to the automobile may be effected to a greater or less extent by moving the separated supporting members longitudinally along the frame member of the automobile; or if desired adjusting spacer devices of various forms of the general type shown in the Lyon Patent 1,140,909 of May 25, 1915, may be interposed between the frame and one or more of these supporting members to be clamped between the same when the clamping or wedging hook bolts are tightened, so as to act as a take up device where necessary and to secure a considerable angular adjustment or positioning of the attaching member with a minimum movement thereof with respect to the automobile frame member.

In the accompanying drawing in which the same reference numeral refers to similar parts in the various figures a number of illustrative embodiments are shown in a more or less diagrammatic manner, and Figure 1 is a side view partly in section showing an attaching member and connected parts in position on an automobile frame member.

Fig. 2 is an enlarged transverse section thereof taken substantially along the line 2—2 of Fig. 1.

Fig. 3 is a partial side sectional view showing another construction.

Fig. 4 is a similar view showing still another arrangement.

Fig. 5 is a transverse section thereof taken substantially along the line 5—5 of Fig. 4.

Fig. 6 is a side sectional view showing still another embodiment.

Figs. 7 to 9 are side sectional views showing different positions in which the device may be used with a spacer plate.

Fig. 10 is an enlarged side sectional view of this spacer plate and coöperating parts; and Fig. 11 is a perspective view of the plate.

The automobile or vehicle buffer may be of any suitable or desired construction and preferably comprises a strip attaching member, such as 5, which may advantageously be formed of tempered spring steel strip or other resilient material. If desired also these strip attaching members may be rigidly connected to the impact receiving or buffer front members, and in some cases these attaching members may be integral with the buffer front as is indicated in Fig. 1 where the end loop portions 50 which are shown in section, may be integral with the attaching member 5 and may be integral with the adjacent portions at least of the buffer front member 51.

These attaching members may advantageously be given a downwardly curved form at about the point 6 as shown in Fig. 1 and adjacent this point it is usually desirable to form an inwardly projecting bearing member, such as 58, by giving the strip a corresponding inward bend 8. In this way a substantially flat bearing surface or member may be formed for coöperation with the outer or web portion of the channel sectioned frame member 1 and the slight offset of the upper and forward portions of the attaching member is sometimes advantageous to avoid objectionable contact with the usual projecting rivet heads, etc. The attaching member is preferably formed with a recurved or inturned portion 7 below the frame member which may be formed with alining portions, such as holes or sockets, which may sometimes be of slot form, to promote the alinement of the hook bolt retainer device which may coöperate therewith and with the adjacent frame member of the automobile. The inner portion 18 of this inturned end of the attaching member is preferably given a bifurcated form by suitable forging, shaping and stamping operations so that two separated supporting alining members may be formed thereon to engage the outer face of the frame flange preferably at a suitable distance away from the frame web and, if desired, substantially in the plane where the hook end of the retainer or hook bolt 14 engages the inner face of the frame flange or reinforcement within the same at some intermediate point between these supporting members, such as 9, 10, see Figs. 1 and 2. As there indicated the stem 13 of the retainer or hook bolt may pass through the bolt hole 16 in the outer bend or portion of the attacher and, if desired, the inner or alining portion of the attacher 18 may be formed with a closed hole or bolt socket 17 so as to definitely hold the hook bolt stem in the desired position with respect to the attacher end so as to more firmly support and square up this end of the buffer with respect to the channel sectioned frame; and simultaneously greatly strengthen the hook bolt against bending strains by supporting the hook bolt at an intermediate point where it engages the inner bolt socket. For some purposes it is desirable to have the contact faces 11 of the separated supporting members of generally curved form as indicated in Fig. 1 and on a larger scale in the Fig. 10 construction, so as to more or less conform with the curved or lower portion of the goose neck ends of the frame adjacent the spring connection 3 by which the automobile spring 4 is secured to the frame. Then when the attacher is moved back onto a flatter or straighter section of the frame the points then making contact with the frame are the nearer or adjacent edges of these contact surfaces 11, so that there is less rise of the mid-point of the attacher than if the extreme ends of the attacher always engaged the frame and the distance between the bolt shank and the lower edge or surface of the frame flange is thus subject to less variation in fitting the device to different automobiles or to different parts of the same frame members. As indicated in Figs. 1 and 2 the hook bolt used may have such a hook end as to properly coöperate or engage the usual front reinforcement 2 within the front part of the channel sectioned automobile frame 1 so that the attacher may be secured to this forward part of the automobile frame member which is often necessary where Gabriel snubbers 63, for instance, have been put in place on the automobile so as to preclude the making of adjustments behind them. Where such an attacher is used in connection with the single thickness portions of the frame to the rear a different form or style of hook bolt may be used to project farther down toward the supporting members below the frame, or if desired, suitable spacing members may be interposed below the hook end or between the supporting members and the lower flange of the frame.

Fig. 3 shows another form of one piece attaching member having a similar upturned bifurcated supporting portion provided with separated alining or supporting members 23 which are indicated as of relatively slight extent longitudinally of the frame member. These may be formed by stamping or otherwise trimming the ends 21, 22 of the inturned end 19 of the attaching member which may be formed with any suitable bolt socket such as the forwardly located bolt hole 20 through which the bolt shank 13 may pass as indicated. Fig. 4 shows still another construction in which an open bolt socket 25 is formed in this inturned supporting portion 24 of the attaching member so that a greater range of movement is permitted between the bolt shank 13 and the attacher. The ends 26, 27 of this part of the attaching member may directly engage the frame flange, or in some cases, if desired, interchangeable or replaceable supporting bushings, such as 29, may be interposed between these parts and as shown in Fig. 5 the slots or depressions 28 may be formed or cut in these supporting members so as to accommodate either contact end or portion 30 or 31 of the bushing which may be loosely slipped over the supporting member so as to engage the slot and then, when forced home against the flange the supporting bushing is automatically retained in this operative position, the slots or holes 32 in the bushings being ample for this purpose, so that a considerable range of adjustment is secured with a corresponding degree of angular adjustment or positioning of the forwardly extending attaching member and the buffer front secured thereto. It is of course understood that, as disclosed in said Patent 1,266,836, the frame members may be provided with attached mud guards 61, and a splash pan 62 such as are indicated in dotted lines in Fig. 5 for example so that only the lower flange of each frame member is left free for engagement by the hook bolts of these various attaching devices herein described. Fig. 6 shows still another arrangement in which the inturned supporting portion of the attaching member may be formed with a generally similar open bolt socket 35 and may have its bifurcated or separated supporting members 33, 34 formed for direct engagement with the single or double thickness frame flange while the hook end 14 of the retainer device engages the inner surface of the flanged frame member. In this case also, if desired, the contact surfaces 36 of these supporting members may be curved so as to more or less conform to the curved lower surface of the frame member.

Figs. 7 to 11 show a desirable form of interchangeable adjusting or spacer plate which may be used with an attaching member having integral separated supporting members of this general character. The attaching member 5 preferably of spring steel strip or other resilient strip material may have an inturned lower portion 7 and bifurcated ends 43, 44 as indicated in Figs. 7 and 10 so that, if desired, an open bolt socket 46 may be provided to accommodate the inner end of the hook bolt or retainer device locking around the frame flange, such a single hook bolt, which is of course preferably of heavy and strong construction and tempered or alloy steel is advantageous for this purpose. If, for example, the parts are made of such proportions as to properly coöperate with the double thickness or reinforced front portion of the automobile frame in the way generally indicated in Fig. 6 a corresponding opening or space occurs when the hook bolt 14 is moved back beyond the internal reinforcement 2 within the frame member, as is shown in Fig. 7. This may be compensated for by interposing a spacer plate 37 having a thickness of three-sixteenths or a quarter of an inch more or less so as to correspond with the thickness of the usual inner front reinforcement used on automobile frames and this spacer plate which preferably has curved ends 38 and a relatively straight or recessed central portion 37 may have projecting or supporting ends 39, 40, held against longitudinal movement while it is definitely retained in the desired position between the bearing member and the inner end of the hook bolt, so that its lateral disengagement with the other parts is precluded. If, however, the attacher must be moved rearward so as to coöperate with a flatter portion of the frame which is more nearly horizontal, as is shown in Fig. 8, the spacer plate may be so adjusted as to have a double thickness or extent above the forward supporting member 43, for example, and while if desired, the rear supporting member 44 may directly engage the frame flange as by projecting through a locating hole 42 in the spacer plate which also holds the plate in lateral and longitudinal position with respect to the supporting member, although, if desired, projecting flanges or locating portions 41 may be arranged on the other supporting end 40 of the spacer plate as shown in greater detail in Fig. 11. When in the position shown in Fig. 8 the interposed supporting end 40 of the spacer plate is preferably substantially perpendicular to the adjacent frame flange and for this reason this part is preferably curved or bent backward somewhat as indicated in Fig. 10 so as to be substantially perpendicular to the frame flange and the curved or backwardly bent end portion 38 of the spacer plate. Another position in which the spacer plate may be used is indicated in Fig. 9 in which the attacher is shown as coöperating with a single thickness inclined portion of the automobile frame, such as occurs in most makes of automobiles. In this instance the forward supporting member 43 may project through the locating hole 42 in the spacer plate while the rear supporting member 44 may engage the projecting supporting end 40 of the spacer plate so as to give an interposed portion of three-eighths or half an inch more or less between this supporting member and the adjacent frame flange. Of course these different positions of the spacer plate give a considerable angular adjustment to these remarkably light and strong spring steel attaching members, and if the angle of the attaching member needs adjustment between these positions this can in practically all cases be secured by moving the attacher supporting members longitudinally along the curved automobile frame so that practically any intermediate angular position can thus be secured; it being of course understood that in some cases hook bolts having slightly different openings or spaces between their shanks and hook ends may be employed in connection with these attacher devices so as to accommodate automobile frames of specially thick or thin construction, etc. These attachers may of course be used in some cases for securing other attachments or auxiliary devices to automobile frame members so that the invention is not of course to be strictly limited to automobile buffers.

This invention has been described in connection with a number of embodiments, forms, proportions, parts, arrangements, materials, methods of manufacture, connection and use, to the details of which disclosure the invention is not of course to be limited, since what is claimed as new and what is desired to be secured by Letters Patent is set forth in the appended claims.

1. In automobile buffers, an automobile having flanged frame members and connected shock absorbing spring controlling devices mounted adjacent the forward ends of the frame members, a buffer having a buffer front and securely connected rearwardly extending spring strip attaching members, each of said attaching members having a downwardly and inwardly bent portion to form a bearing member to coöperate with the web of the frame flange and having an inturned lower bent portion formed with a bolt socket and having its upwardly extending inturned end bifurcated to form separated alining supporting members adapted to engage the lower flange of the frame member at points considerably removed from said web, a hook bolt coöperating with each of said attaching members and having a shank extending through said bolt sockets and adapted to coöperate with the inner face of said frame flange at a point between said supporting members and an interchangeable adjusting spacer plate having an upturned supporting end adapted to be interposed between one of said supporting members and the adjacent frame flange and having a locating hole adapted to receive the other supporting member and maintain said supporting end in operative position.

2. In automobile buffers, an automobile having flanged frame members and connected shock absorbing spring controlling devices mounted adjacent the forward ends of the frame members, a buffer having a buffer front and securely connected rearwardly extending attaching members, each of said attaching members having a downwardly and inwardly bent portion to form a bearing member to coöperate with the web of the frame flange and having an inturned lower bent portion formed with a bolt socket and having separated alining supporting members adapted to engage the lower flange of the frame member at points considerably removed from said web, a hook bolt coöperating with each of said attaching members and having a shank extending through said bolt sockets and adapted to coöperate with the inner face of said frame flange at a point between said supporting members and an interchangeable adjusting spacer plate having an upturned supporting end adapted to be interposed between one of said supporting members and the adjacent frame flange and having a locating hole adapted to receive the other supporting member.

3. In automobile buffers, an automobile having flanged frame members and mud guards and spring cushioning devices secured to said frame members, a buffer having a front impact member and connected resilient strip supporting members formed with bearing members adapted to coöperate with the outer faces of the webs of said automobile frame members, the ends of each of said attaching members being downwardly bent and inturned and provided with integral upwardly extending supporting members adapted to coöperate with the outside of the lower flange of each of said frame members at a considerable distance from said web, an inclosed bolt socket formed in both outer and inner portions of said inturned portion and a hook bolt fastening device extending through said bolt sockets and adapted to hook around the inner edge of said lower flange to hold said bearing member and supporting members in engagement with said frame member.

4. In automobile buffers, an automobile having flanged frame members and mud guards, a buffer having a front impact member and connected strip supporting members formed with bearing members adapted to coöperate with the outer faces of the webs of said automobile frame members, the ends of each of said attaching members being downwardly bent and inturned and provided with upwardly extending supporting members adapted to coöperate with the outside of the lower flange of each of said frame members at a considerable distance from said web, a bolt socket formed in both outer and inner portions of said inturned portion and a fastening device extending through said bolt sockets to hold said bearing member and supporting members in engagement with said frame member.

5. In automobile buffers, an automobile having flanged frame members and mud guards and spring cushioning devices secured to said frame members, a buffer having a front impact member and connected resilient strip supporting members formed with inwardly offset bearing members adapted to coöperate with the outer faces of the webs of said automobile frame members, the ends of each of said attaching members being downwardly bent and inturned and bifurcated to form upwardly extending separated supporting members adapted to engage the outside of the lower flange of each of said frame members, a bolt socket formed in said inturned portion and a hook bolt fastening device extending through said bolt socket and adapted to hook around the inner edge of said lower flange to hold said bearing member and supporting members in engagement with said frame member.

6. In automobile buffers, an automobile having flanged frame members and mud guards and spring cushioning devices secured to said frame members, a buffer having a front impact member and connected resilient strip supporting members formed with bearing members adapted to coöperate with the outer faces of the webs of said automobile frame members, the ends of each of said attaching members being downwardly bent and inturned to form upwardly extending separated supporting members adapted to engage the outside of the flange of each of said frame members, a bolt socket formed in said inturned portion and a fastening device having a portion extending through said bolt socket and adapted to hold said bearing member and supporting members in engagement with said frame member.

7. In attaching devices adapted for use in attaching an automobile buffer or the like to automobile frame members having projecting flanges, a steel strip attaching member having a downwardly bent portion to form a bearing member adapted to coöperate with the web of a frame member, an inturned bent portion on said attaching member formed with a bolt socket, and having on its inturned upwardly extending end integral supporting members separated to a greater extent than the width of said attaching member strip and adapted to engage the lower flange of said frame member at points somewhat removed from said web, and a coöperating hook bolt having a shank extending through said bolt socket and having a hook end adapted to extend around the lower flange of said frame member and engage the inner surface thereof at a point intermediate said supporting members to insure reliable connection between these parts.

8. In attaching devices adapted for use in attaching an automobile buffer or the like to automobile frame members having projecting flanges, a strip attaching member having a downwardly bent portion to form a bearing member adapted to coöperate with the web of a frame member, an inturned bent portion on said attaching member formed with a bolt socket, and having on its inturned upwardly extending end integral supporting members and adapted to engage the lower flange of said frame member at points somewhat removed from said web, and a coöperating bolt having a shank extending through said bolt socket and adapted to extend around and engage the frame flange at a point intermediate said supporting members.

9. In attaching devices adapted for use in attaching an automobile buffer or the like to automobile frame members having projecting flanges, a strip attaching member having a downwardly bent portion to form a bearing member adapted to coöperate with the web of a frame member, an inturned bent portion on said attaching member formed with a bolt socket, and having on its inturned upwardly extending end integral supporting members and adapted to engage the flange of said frame member at points somewhat removed from said web.

10. In attaching devices adapted for use in attaching an automobile buffer or the like to automobile frame members having projecting flanges, an attaching member of spring steel strip having a downwardly and inwardly bent portion to form a substantially flat bearing member to coöperate with the web of a frame member, an inturned bent portion on said attaching member formed with bolt sockets, and having its inturned upwardly extending end bifurcated to form alining supporting members on either side of said bolt sockets and separated to a greater extent than the width of said attaching member strip to engage the lower flange of said frame member at points somewhat removed from said web, and a coöperating hook bolt having a shank extending through said bolt sockets and having a hook end extending around the lower flange of said frame member and engaging the inner surface thereof at a point substantially in the plane of said supporting members to insure reliable connection between these parts with a minimum of lateral and longitudinal extent of the attaching device adjacent the lower part of the frame member.

11. In attaching devices adapted for use in attaching an automobile buffer or the like to an automobile frame members having projecting flanges, an attaching member of steel strip having a downwardly bent portion to form a substantially flat bearing member to coöperate with the web of a frame member, an inturned bent portion on said attaching member formed with a bolt socket, and having its inturned upwardly extending end bifurcated to form alining supporting members on either side of said bolt sockets and separated to a greater extent than the width of said attaching member strip to engage the lower flange of said frame member, and a coöperating hook bolt having a shank extending through said bolt socket and having a hook end extending around the lower flange of said frame member and engaging the inner surface thereof to insure reliable connection between these parts with a minimum of lateral and longitudinal extent of the attaching device adjacent the lower part of the frame member.

12. In attaching devices adapted for use in attaching an automobile buffer or the like to automobile frame members having projecting flanges, an attaching member of steel strip having a downwardly bent portion to form a bearing member to coöperate with the web of a frame member, an inturned bent portion on said attaching member formed with a bolt socket, and having its inturned upwardly extending end formed with alining supporting members separated to a greater extent than the width of said attaching member strip to engage the flange of said frame member, and a coöperating fastening device having a shank extending through said bolt socket and extending around the flange of said frame member to insure reliable connection between these parts with a minimum of lateral and longitudinal extent of the attaching device adjacent the lower part of the frame member.

13. In attaching devices adapted for use in attaching an automobile buffer or the like to automobile frame members having projecting flanges, a strip attaching member adapted to be connected to a bifurcated front and having a downwardly and inwardly bent portion to form a substantially flat bearing member adapted to coöperate with the web of the frame member, an inturned bent portion on said attaching member formed with a bolt socket, and having on its inturned upwardly extending end integral alining supporting members separated to a greater extent than the width of said attaching member strip and adapted to engage the lower flange of said frame member, a coöperating hook bolt having a shank extending through said bolt socket and having a hook end adapted to coöperate with a flange of said frame member and engage the inner surface thereof at a point intermediate said supporting members and an interchangeable adjusting spacer plate having a slotted upturned supporting end and having a locating hole adjacent its other end and adapted to be interposed between said supporting members and said frame flange.

14. In attaching devices adapted for use in attaching an automobile buffer or the like to automobile frame members having projecting flanges, a strip attaching member adapted to be connected to a buffer front and having a bearing member adapted to coöperate with the web of the frame member, an inturned bent portion on said attaching member formed with a bolt socket, and having on its inturned upwardly extending end integral alining supporting members adapted to engage the lower flange of said frame member, a coöperating hook bolt having a shank extending through said bolt socket and having a hook end adapted to coöperate with a flange of said frame member at a point intermediate said supporting members, and an interchangeable adjusting spacer plate having an upturned supporting end and having a locating portion adjacent its other end and adapted to be interposed between said supporting members and said frame flange.

15. In attaching devices adapted for use in attaching an automobile buffer or the like to automobile frame members having projecting flanges and internal front reinforcements, an attaching member of spring steel strip having a bolt socket and a bearing member to coöperate with the web of the frame flange and having integral separated alining supporting members adapted to engage the lower flange of said frame member, a coöperating hook bolt having a shank extending through said bolt socket adjacent said frame flange to coöperate therewith, and an interchangeable adjusting spacer plate adapted to be interposed between said supporting members and said frame flange and having a thickness substantially equal to said front reinforcement and having a double thickness end portion and a locating hole adjacent its other end.

16. In attaching devices adapted for use in attaching an automobile buffer or the like to automobile frame members having projecting flanges and internal front reinforcements, an attaching member having a bolt socket and a bearing member to coöperate with the web of the frame flange and having separated alining supporting members adapted to engage a flange of said frame member, a coöperating hook bolt having a shank extending through said bolt socket adjacent said frame flange to coöperate therewith, and an interchangeable adjusting spacer plate adapted to be interposed between said supporting members and said frame flange and having a thickness substantially equal to said front reinforcement and having a double thickness end portion and a locating hole adjacent its other end.

17. In attaching devices adapted for use in attaching an automobile buffer or the like to automobile frame members having projecting flanges, an attaching member having separated alining supporting members adapted to engage a flange of said frame member, and an interchangeable adjusting spacer plate adapted to be interposed between said supporting members and said frame flange and having a double thickness end portion and a locating hole adjacent its other end to be penetrated by one of said supporting members.

18. In attaching devices adapted for use in attaching an automobile buffer to flanged automobile frame members having mud guards and spring cushioning devices secured thereto, resilient strip supporting members adapted to be connected to the impact receiving member of the buffer and formed with bearing members adapted to coöperate with the outer faces of the webs of said automobile frame members, the ends of said attaching members being inturned and formed with integral bifurcated upwardly extending supporting members adapted to engage the lower face of the outside of the lower flange of each of said frame members at a distance from said web, substantially closed alined bolt sockets formed adjacent said bearing members and in the ends of said attaching members at a distance from the corresponding bearing member and hook bolt fastening devices extending through said bolt sockets and adapted to hook around the inner edges of said flanges to hold said bearing members and supporting members in engagement with said frame members.

19. In attaching devices adapted for use in attaching an automobile buffer to flanged automobile frame members having mud guards and spring cushioning devices secured thereto, resilient strip supporting members adapted to be connected to the impact receiving member of the buffer and formed with bearing members adapted to coöperate with the outer faces of the webs of said automobile frame members, the ends of said attaching members being formed with integral bifurcated supporting members adapted to engage the outside of the flange of each of said frame members, substantially closed alined bolt sockets formed adjacent said bearing members and in the ends of said attaching members at a distance from the corresponding bearing member and adapted to engage the shank of a fastening device at separated points to have alining coöperation therewith.

20. In attaching devices adapted for use in attaching an automobile buffer to flanged automobile frame members having mud guards secured thereto, a resilient strip supporting member adapted to be connected to the impact receiving member of the buffer and formed with a bearing member adapted to coöperate with the outer face of the web of one of said automobile frame members, the end of said attaching members being inturned and formed with integral bifurcated upwardly extending supporting members substantially parallel to said bearing member and adapted to engage the outside of the lower flange of said frame member at a distance from said web, there being substantially closed alined bolt sockets formed adjacent said bearing member and in the end of said attaching member at a distance from said bearing member and a hook bolt fastening device extending through said bolt sockets and adapted to hook around the inner edge of said frame flange to hold said bearing member and supporting members in engagement with said frame member.

21. In attaching devices adapted for use in attaching an automobile buffer to flanged automobile frame members having mud guards secured thereto, a strip supporting member adapted to be connected to the impact receiving member of the buffer and formed with a bearing member adapted to coöperate with the outer face of the web of one of said automobile frame members, the end of said attaching members being inturned and formed with integral separated supporting members adapted to engage the outside the flange of said frame member, there being substantially bolt sockets formed adjacent said bearing member and in the end of said attaching member at a distance from said bearing member and adapted to engage the shank of a fastening device at separated points to have alining and strengthening coöperation therewith.

22. In attaching devices adapted for use in attaching an automobile buffer to the flanged frame members of an automobile, a supporting contact member of resilient strip material formed with a bearing member adapted to coöperate with the outer face of the web of one of the automobile frame members and formed with an integral inturned portion having separated supporting members adapted to engage the outside of the flange of the frame member, there being a substantially closed bolt hole in said supporting contact member adjacent said contact portion and an alined closed bolt socket adjacent said separated supporting members at a distance from said bearing member, said supporting contact member being adapted to engage the shank of a hook bolt fastening device at separated points to have alining and strengthening coöperation therewith.

23. In attaching devices adapted for use in attaching an automobile buffer to the flanged frame members of an automobile, a supporting contact member formed with a bearing member adapted to coöperate with the outer face of the web of one of the automobile frame members and formed with an integral inturned portion having supporting members adapted to engage the outside of the flange of the frame member, there being a substantially closed bolt hole in said supporting contact member adjacent said contact portion and an alined bolt socket adjacent said separated supporting members at a distance from said bearing member, said supporting contact member being adapted to engage the shank of a hook bolt fastening device at separated points to have alining and strengthening coöperation therewith.

GEORGE ALBERT LYON.